United States Patent
Komura et al.

(10) Patent No.: US 8,130,599 B2
(45) Date of Patent: *Mar. 6, 2012

(54) THERMALLY-ASSISTED MAGNETIC RECORDING HEAD COMPRISING NEAR-FIELD OPTICAL DEVICE WITH PROPAGATION EDGE

(75) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 204 days.

This patent is subject to a terminal disclaimer.

(21) Appl. No.: 12/616,924

(22) Filed: Nov. 12, 2009

(65) Prior Publication Data

US 2011/0110202 A1    May 12, 2011

(51) Int. Cl.
*G11B 11/00* (2006.01)
(52) U.S. Cl. .................. 369/13.33; 369/112.27; 360/59
(58) Field of Classification Search ............... 369/13.33, 369/13.24, 13.12, 13.32, 13.13, 112.27, 13.14, 369/13.03, 13.02, 112.09; 360/59, 313, 245.3, 360/126, 123.17
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,454,095 B2 | 11/2008 | Baehr-Jones et al. | |
| 2008/0151431 A1 | 6/2008 | Tanaka et al. | |
| 2008/0204916 A1 | 8/2008 | Matsumoto et al. | |
| 2010/0103553 A1* | 4/2010 | Shimazawa et al. | 360/59 |
| 2011/0116349 A1* | 5/2011 | Komura et al. | 369/13.33 |
| 2011/0176398 A1* | 7/2011 | Tanaka et al. | 369/13.33 |

FOREIGN PATENT DOCUMENTS

JP   2004-273021   9/2004
JP   2008-111845   5/2008

OTHER PUBLICATIONS

Michael Hochberg, et al., "Integrated Plasmon and dielectric waveguides" Optics Express, vol. 12, No. 22, Nov. 2004, pp. 5481-5486.
E. Kretschmann, et al., "Radiative Decay of Non Radiative Surface Plasmons Excited by Light" Z. Naturforsch, vol. 23a, 1968, pp. 2135-2136.
Andreas Otto, "Excitation of Nonradiative Surface Plasma Waves in Silver by the Method of Frustrated Total Reflection" Zeitschrift fur Physik, vol. 216, 1968, pp. 398-410.
U.S. Appl. No. 12/260,639, Koji Shimazawa, et al., filed Oct. 29, 2008.

* cited by examiner

*Primary Examiner* — Ali Neyzari
(74) *Attorney, Agent, or Firm* — Frommer Lawrence & Haug LLP

(57) ABSTRACT

There is provided a near-field-light (NFL) generating optical system in which the point where near-field (NF) light is generated can be provided sufficiently close to the end surface of a magnetic pole that generates write field. The optical system comprises: a waveguide through which a light for exciting surface plasmon propagates; and a NF-optical device configured to be coupled with the light in a surface plasmon mode. The NF-optical device comprises: an opposed-to-waveguide surface opposed to the waveguide with a predetermined distance; and a propagation edge provided on the side opposite to the opposed-to-waveguide surface, extending to the NFL-generating end surface of the device, and configured to propagate thereon the surface plasmon excited by the light. In this optical system, the point, where NF-light is generated, of the NFL-generating end surface can be located on the side opposite to the waveguide.

16 Claims, 14 Drawing Sheets

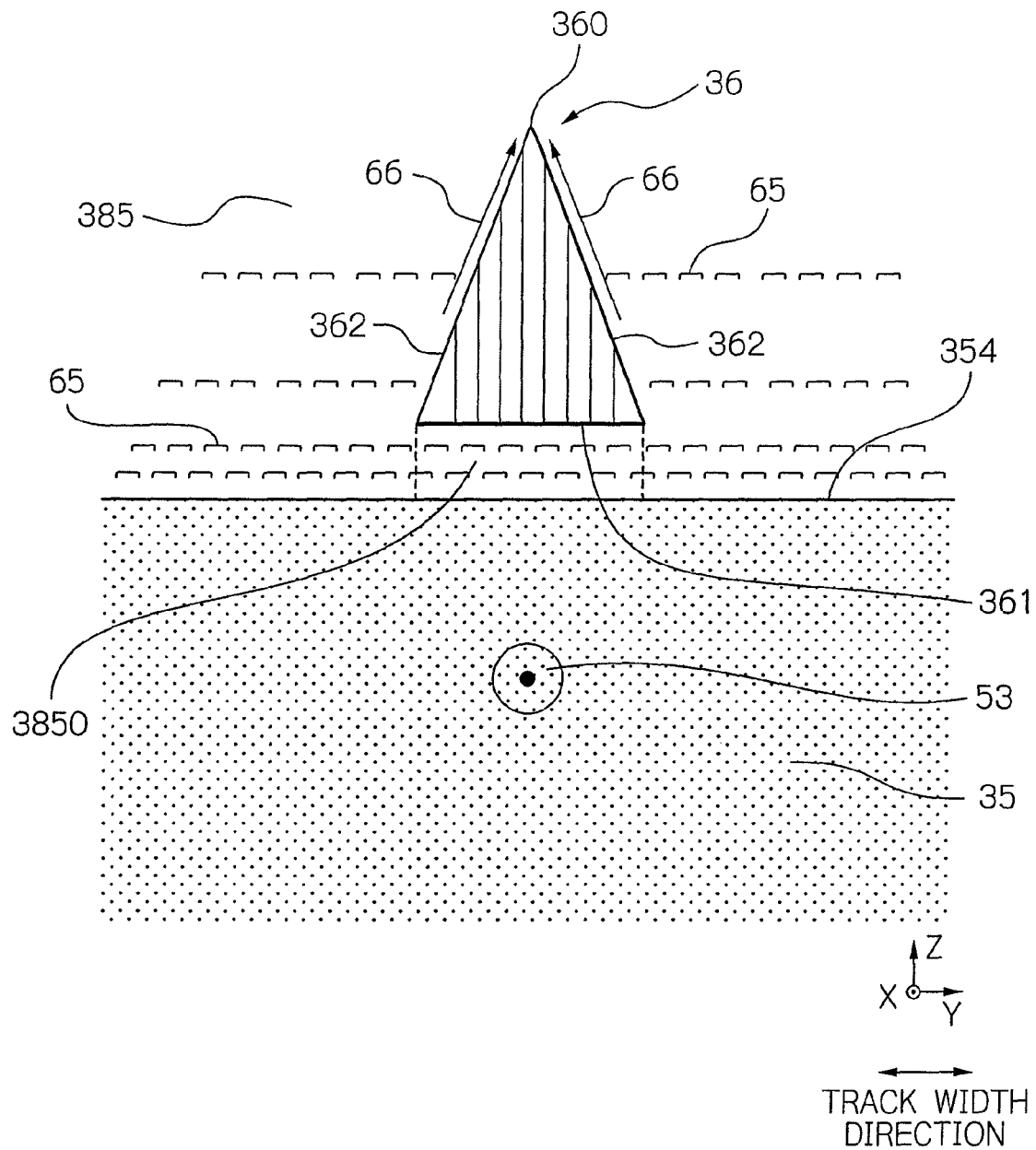

THERMALLY-ASSISTED MAGNETIC RECORDING HEAD COMPRISING NEAR-FIELD OPTICAL DEVICE WITH PROPAGATION EDGE

BACKGROUND OF THE INVENTION

1. Field of the Invention

The present invention relates to a near-field-light-generating (NFL-generating) optical system for generating near-field light (NF-light) by receiving light. The present invention further relates to a head used for thermally-assisted magnetic recording in which a magnetic recording medium is irradiated with NF-light, thereby anisotropic magnetic field of the medium is lowered, thus data can be written. Further, the present invention relates to a magnetic recording apparatus provided with the head.

2. Description of the Related Art

As the recording densities of magnetic recording apparatuses become higher, as represented by magnetic disk apparatuses, further improvement has been required in the performance of thin-film magnetic heads and magnetic recording media. In the magnetic recording media, it is especially necessary to decrease the size of magnetic grains that constitute a magnetic recording layer of the medium and to reduce irregularity in the boundary of record bit, thus to form minute record bits reliably. However, the decrease in size of the magnetic grains raises a problem of degradation in thermal stability of the magnetization due to the decrease in volume. As a measure against the thermal stability problem, it may be possible to increase magnetic anisotropy energy $K_U$ of the magnetic grains. However, the increase in energy $K_U$ causes the increase in anisotropic magnetic field (coercive force) of the magnetic recording medium. As a result, the head cannot write data to the magnetic recording medium when the anisotropic magnetic field (coercive force) of the medium exceeds the write field limit.

Recently, as a method for solving the problem of thermal stability, so-called a thermally-assisted magnetic recording technique is proposed. In the technique, a magnetic recording medium formed of a magnetic material with a large magnetic anisotropy energy $K_U$ is used so as to stabilize the magnetization; anisotropic magnetic field of the medium is reduced by applying heat to a portion of the medium where data is to be written; just after that, writing is performed by applying write magnetic field (write field) to the heated portion.

In the thermally-assisted magnetic recording, a technique is well known, which utilizes a near field optical device (NF-optical device) as a metal piece that generates NF-light from plasmon excited by irradiated laser light. For example, U.S. Pat. Nos. 6,768,556 and 6,649,894 disclose a technique in which NF-light is generated by irradiating a metal scatterer with light and by matching the frequency of the light with the resonant frequency of plasmon excited in the metal.

As described above, various kinds of thermally-assisted magnetic recording systems with NF-optical devices have been proposed. Meanwhile, the present inventors have devised a NF-optical device in which laser light is coupled with the NF-optical device in a surface plasmon mode to cause excited surface plasmon to propagate to the opposed-to-medium surface, thereby providing NF-light, instead of directly applying laser light to a NF-optical device. The NF-optical device is hereinafter referred to as a surface plasmon generator. In the surface plasmon generator, its temperature does not excessively rise because laser light is not directly applied to the surface plasmon generator. As a result, there can be avoided a situation in which the end of a read head element, which reaches the opposed-to-medium surface, becomes relatively far apart from the magnetic recording medium due to the thermal expansion of the NF-optical device, which makes it difficult to properly read servo signals. In addition, there can also be avoided a situation in which the light use efficiency of a NFL-generating optical system including a NF-optical device is degraded because thermal fluctuation of free electrons increases in the NF light generator.

Here, the NFL-generating optical system is an optical system that includes a waveguide and a NF-optical device, and the light use efficiency of the NFL-generating optical system is given by $I_{OUT}/I_{IN}$ (×100), where $I_{IN}$ is the intensity of laser light incident to the waveguide, and $I_{OUT}$ is the intensity of NF-light emitted from a near-field-light-generating end (NFL-generating end) of the NF-optical device after converting the laser light into surface plasmon in the NF-optical device.

To perform thermal-assisted magnetic recording in practice by using the above-described NFL-generating optical system including the surface plasmon generator, the end surface of the surface plasmon generator is required to be located as close to the end surface of a magnetic pole as possible in the opposed-to-medium surface, the magnetic pole being provided for generating write field. In particular, the distance between them in the direction along track is preferably set to 100 nm (nanometers) or less. Further, the distance between the emitting position of NF-light on the end surface of the surface plasmon generator and the write-field-generating position of on the magnetic-pole end surface is required to be set sufficiently small. By satisfying these conditions, there can be obtained a sufficiently large field gradient of write field generated from the magnetic pole in a position on the magnetic recording medium where NF-light is applied, thereby to enable write operations to be reliably performed.

However, generally, the NF-optical device is provided adjacent to the end portion on the opposed-to-medium surface side of the waveguide to convert the light propagating through the waveguide into NF-light. Here, the waveguide and the magnetic pole is required to be provided sufficiently apart from each other in order to avoid a situation in which the light use efficiency of the NFL-generating optical system is drastically reduced due to the absorption of the light propagating through the waveguide by the magnetic pole formed of a metal. This requirement conflicts with the requirement that the NF-optical device and the magnetic pole should be set as close as possible. Therefore, to resolve the conflict, important is the appropriate configuration and arrangement of the waveguide, the NF-optical device and the magnetic pole. Further, significantly important is to control the emitting position of NF-light on the end surface of the surface plasmon generator. Thus, it is understood to be significantly important that a NFL-generating optical system should be realized, in which a NF-optical device with an adjusted emitting position can be provided adjacent to the magnetic pole, in order to perform appropriate thermally-assisted magnetic recording.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head is provided, which comprises:

a waveguide through which a light for exciting surface plasmon propagates;

a NF-optical device configured to be coupled with the light in a surface plasmon mode and to emit NF-light from a NFL-generating end surface that forms a portion of an opposed-to-medium surface; and a magnetic pole for generating write field from its end on the opposed-to-medium surface side, the NF-optical device comprising: an opposed-to-waveguide surface opposed to the waveguide with a predetermined distance; and a propagation edge provided on the side opposite to the opposed-to-waveguide surface, extending to the NFL-generating end surface, and configured to propagate thereon the surface plasmon excited by the light.

In this thermally-assisted magnetic recording head, the point, where NF-light is generated, of the NFL-generating end surface of the NF-optical device can be located on the side opposite to the waveguide. As a result, in thermally-assisted magnetic recording, the point where NF-light is generated can be provided sufficiently close to the end surface of the magnetic pole that generates write field, without laying the waveguide therebetween. As a result, there can be appropriately heated a portion to be written on the magnetic recording medium. Here, it is preferable that the NF-optical device has substantially a shape of triangle pole, and the opposed-to-waveguide surface is one of side surfaces of the triangle pole, and the propagation edge is a side edge that is opposed to the one side surface.

Further, in the thermally-assisted magnetic recording head according to the present invention, the distance between the opposed-to-waveguide surface and the propagation edge is preferably 90 nm (nanometers) or more, and 200 nm or less. It is also preferable that the vertex angle of a vertex corresponding to the propagation edge in a cross-section of the NF-optical device is 20° (degrees) or more, and 70° or less, the cross-section being taken by a plane perpendicular to the propagation edge. By satisfying these conditions, NF-light with a sufficiently high intensity can be generated from the vertex having a vertex angle $\theta_{NF}$ of the NFL-generating end surface.

Further, in the thermally-assisted magnetic recording head according to the present invention, the propagation edge is preferably rounded. In this case, the vertex radius (curvature radius) of the rounded propagation edge is preferably 7 nm or more, and 20 nm or less. And the distance between the waveguide and the NF-optical device is preferably 2 nm or more, and 185 nm or less. Further, the NF-optical device is preferably formed of a silver alloy that contains at least one element selected from a group of palladium (Pd), gold (Au), copper (Cu), ruthenium (Ru), rhodium (Rh) and iridium (Ir).

Furthermore, in the thermally-assisted magnetic recording head according to the present invention, the NF-optical device is preferably provided between the waveguide and the magnetic pole in such a way that the propagation edge is opposed to the magnetic pole. In this configuration, it is also preferable that the propagation edge is rounded with a predetermined vertex radius, and the distance between a vertex corresponding to the propagation edge in the NFL-generating end surface and an end surface of the magnetic pole on the opposed-to-medium surface side is equal to or more than the vertex radius, and is 100 nm or less. Further, it is preferable that the NF-optical device is covered with a material that has a refractive index lower than a refractive index of a constituent material of the waveguide, a portion of the material that covers the NF-optical device lying between the magnetic pole and the propagation edge. In this case, it is also preferable that the material is a constituent material of an overcoat layer formed so as to cover the waveguide, the NF-optical device, and the magnetic pole. Further, in the thermally-assisted magnetic recording head according to the present invention, a magnetic shield is preferably provided on the side opposite to the magnetic pole when viewed from the NF-optical device.

Further, in the thermally-assisted magnetic recording head according to the present invention, it is preferable that the waveguide, the portion of the material that covers the NF-optical device, and the NF-optical device are arranged in an Otto configuration. The Otto configuration is a configuration of optical system for exciting surface plasmon, as well as a Kretschmann configuration. The principle of exciting surface plasmon by utilizing the Otto configuration is different from the principle of exciting surface plasmon by utilizing the Kretschmann configuration.

According to the present invention, a head gimbal assembly (HGA) is further provided, which comprises the above-described thermally-assisted magnetic recording head and a suspension supporting the thermally-assisted magnetic recording head.

According to the present invention, a magnetic recording apparatus is further provided, which comprises: at least one HGA as described above; at least one magnetic recording medium; and a recording circuit configured to control write operations that the thermally-assisted magnetic recording head performs to the at least one magnetic recording medium, the recording circuit further comprising a light-emission control circuit configured to control operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 6a and 6b show schematic views for explaining the thermally-assisted magnetic recording utilizing a surface plasmon mode according to the present invention;

DESCRIPTION OF THE PREFERRED EMBODIMENTS

Figure 1:
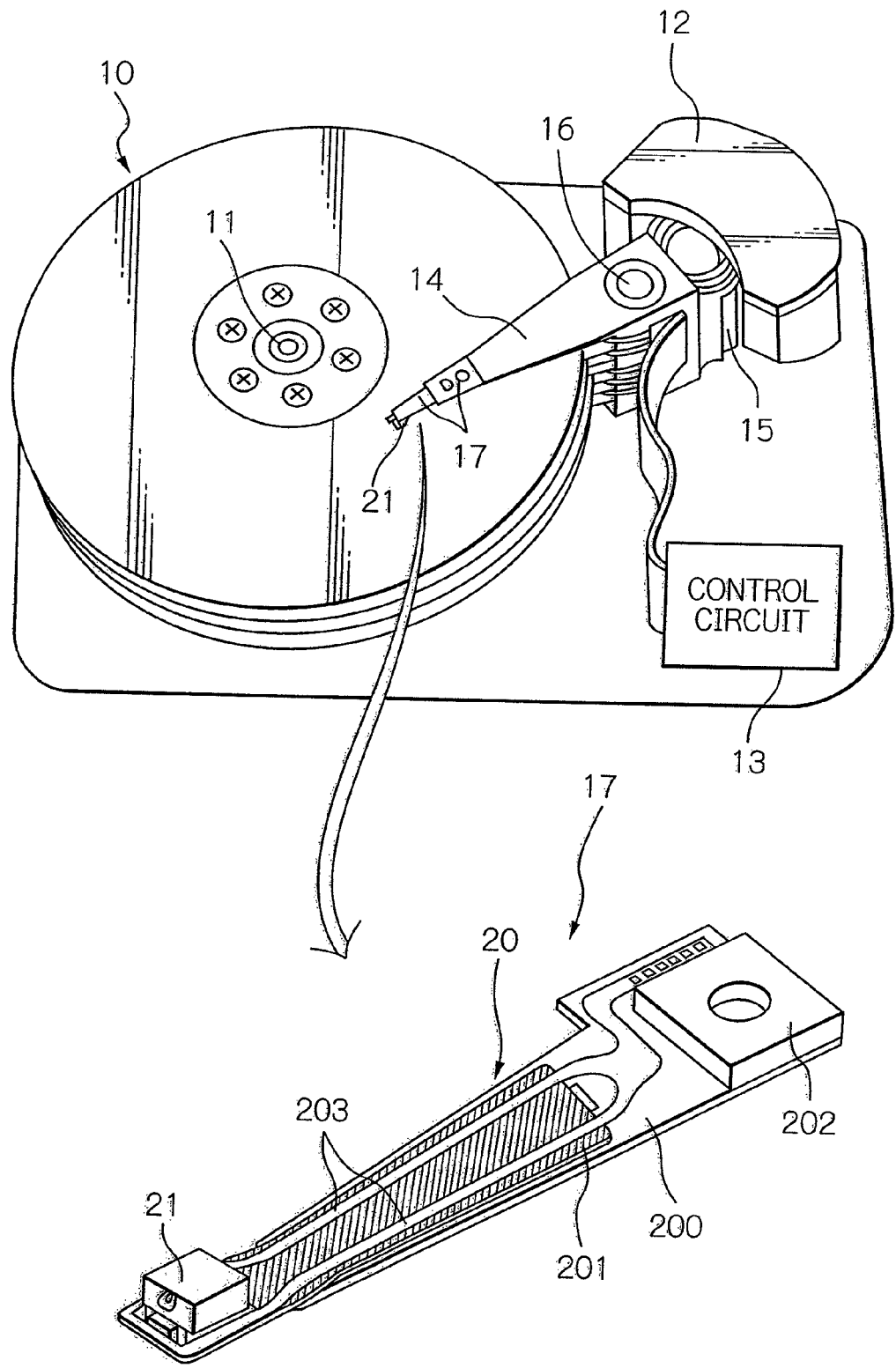
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
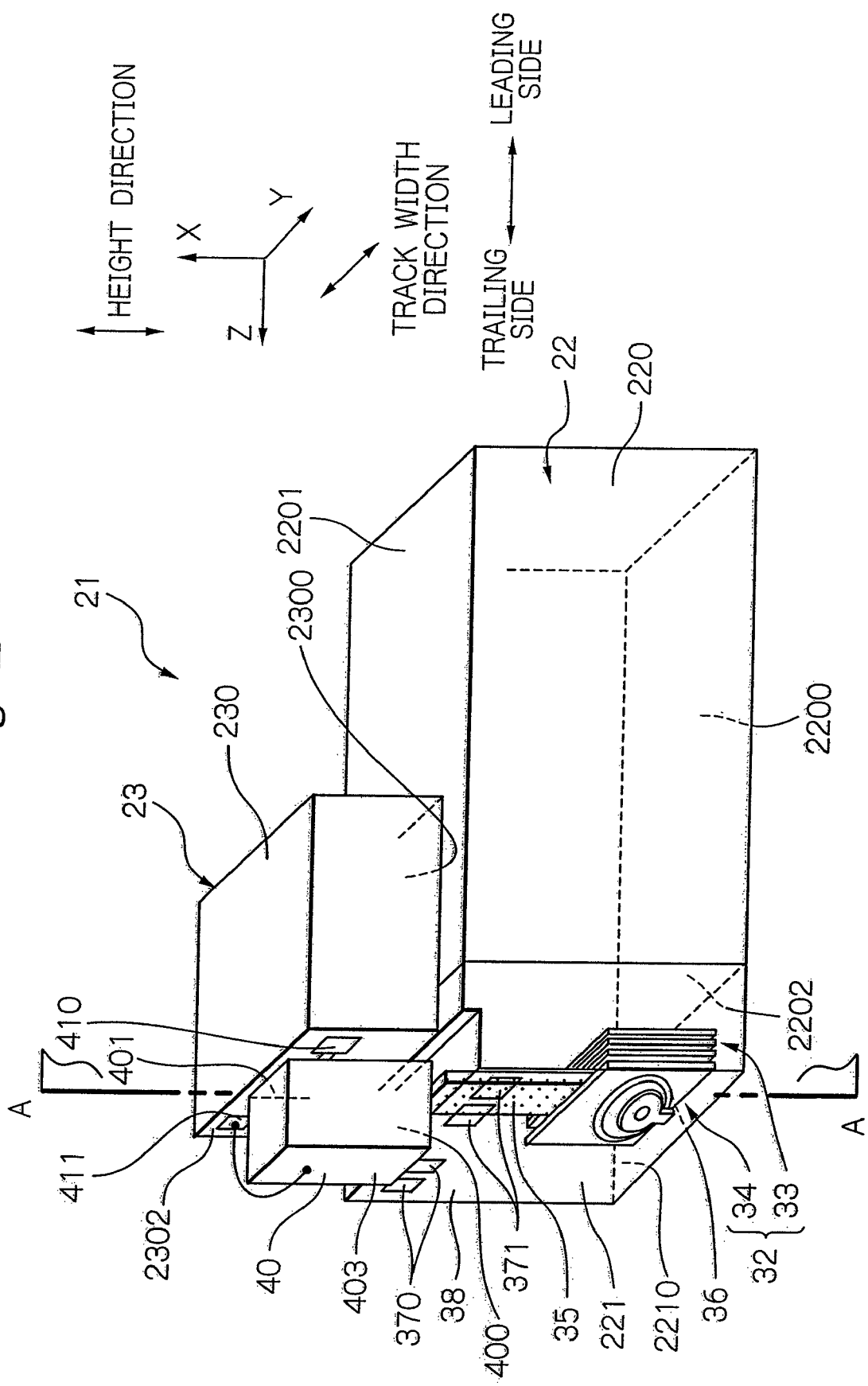
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon generator 36, the generator 36 and the waveguide 35 constituting a near-field-light-generating (NFL-generating) optical system; an overcoat layer 38 formed on the element-formation surface 2202 in such a way as to cover the MR element 33, the electromagnetic transducer 34, the waveguide 35, and the surface plasmon generator 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the surface plasmon generator 36 reach a head part end surface 2210, which is an opposed-to-medium surface of the head part 221. Here, the head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the propagating laser light is coupled with the surface plasmon generator 36 in a surface plasmon mode, and causes surface plasmon to be excited on the surface plasmon generator 36. The surface plasmon propagates on a propagation edge, which will be explained later, of the surface plasmon generator 36 toward the head part end surface 2210, the propagation edge being on the side opposite to the waveguide 35 in the surface plasmon generator 36. Thereby, near-field light (NF-light) is generated from the end of the surface plasmon generator 36 on the head part end surface 2210 side. The generated NF-light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field to the portion with decreased anisotropic magnetic field.

Figure 3:
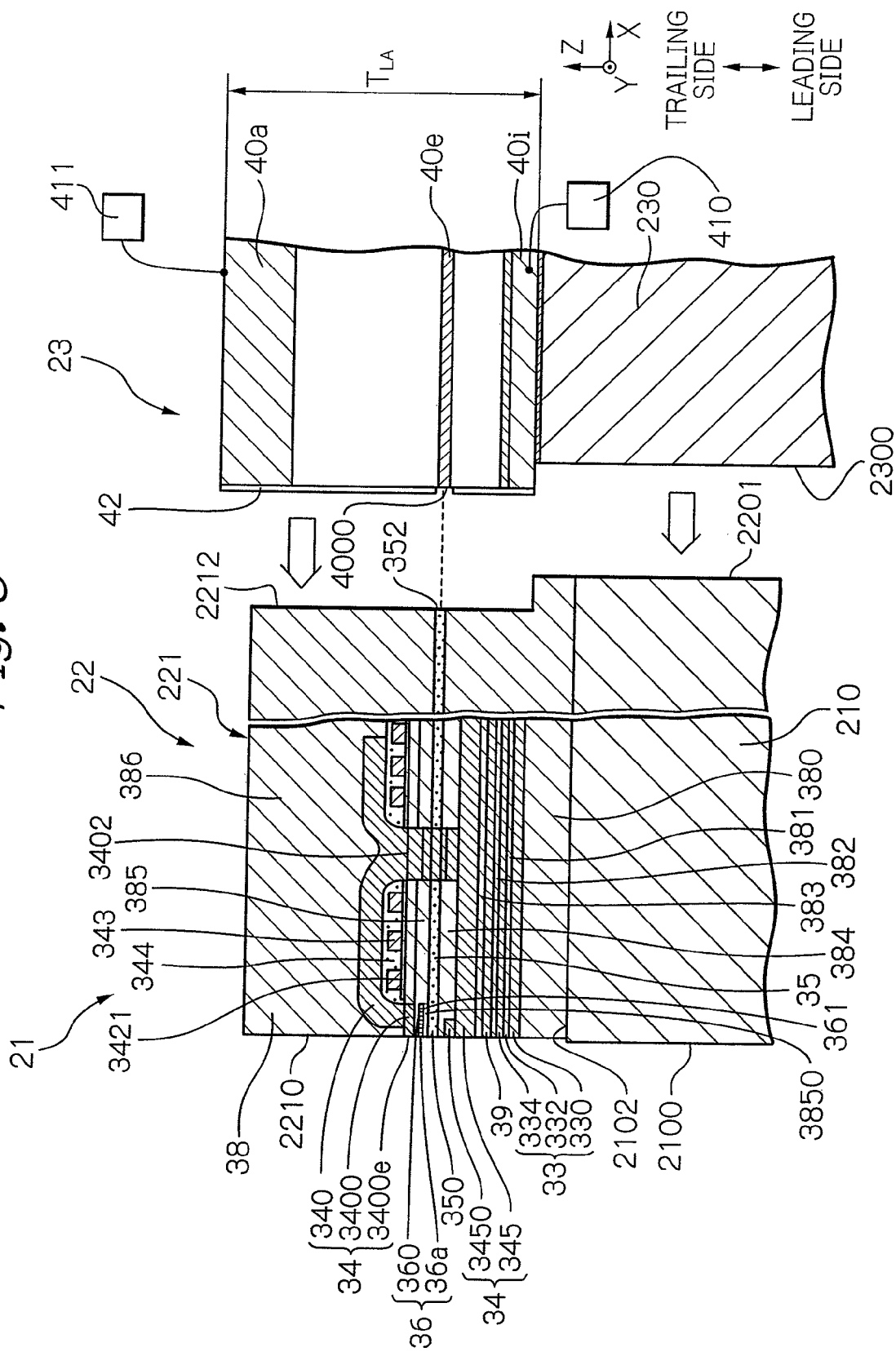
FIG. 3 shows a cross-sectional view taken by plane A in FIG. 2, schematically illustrating the structure of a main part of the thermally-assisted magnetic recording head according to the present invention.

FIG. 3 shows a cross-sectional view taken by plane A in FIG. 2, schematically illustrating the structure of a main part of the thermally-assisted magnetic recording head 21.

As shown in FIG. 3, the MR element 33 is formed on an insulating layer 380 stacked on the element-formation surface 2202, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

Figure 4:
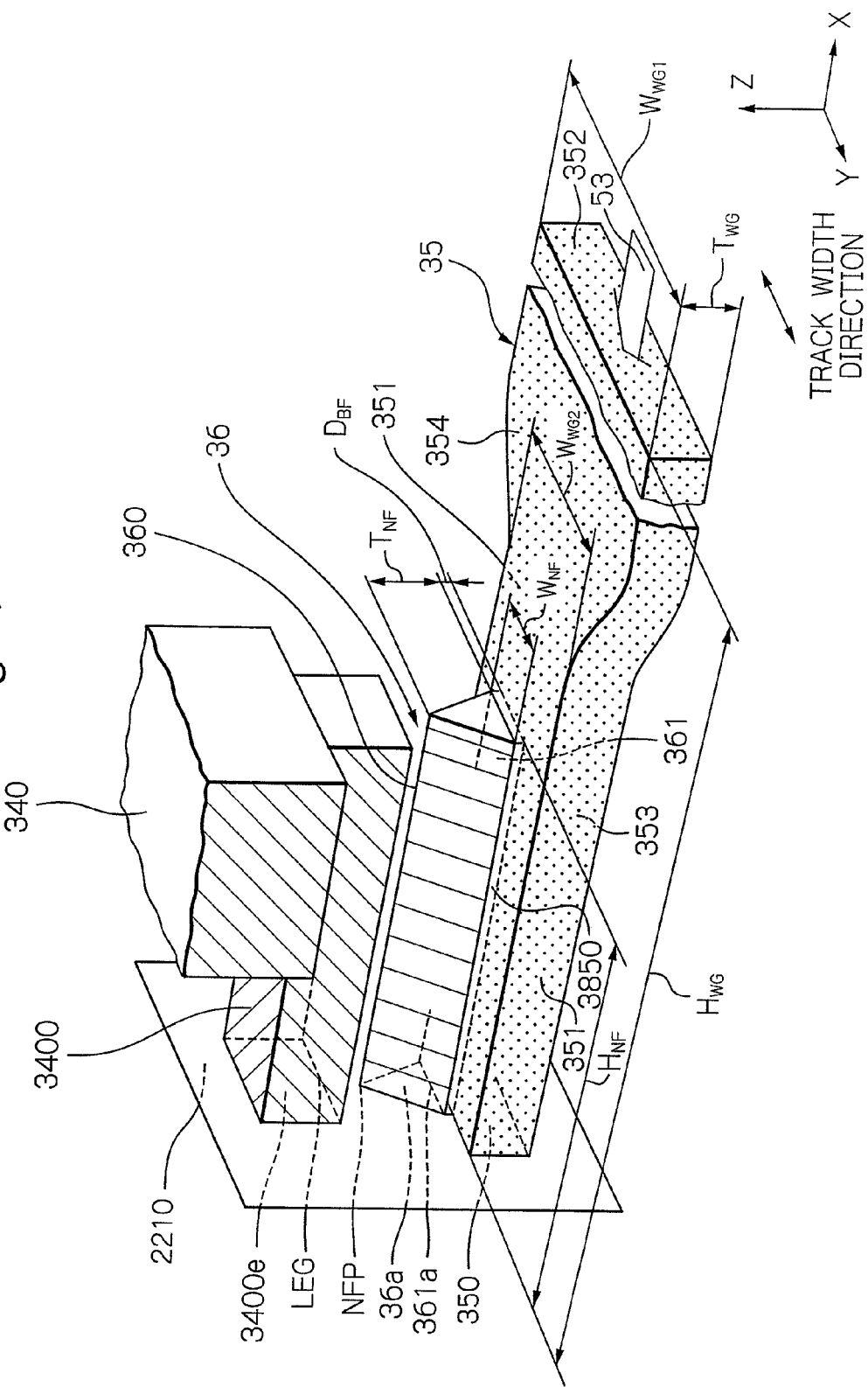
FIG. 4 shows a perspective view schematically illustrating the configuration of the waveguide, the surface plasmon generator and the main magnetic pole.
Figure 5:
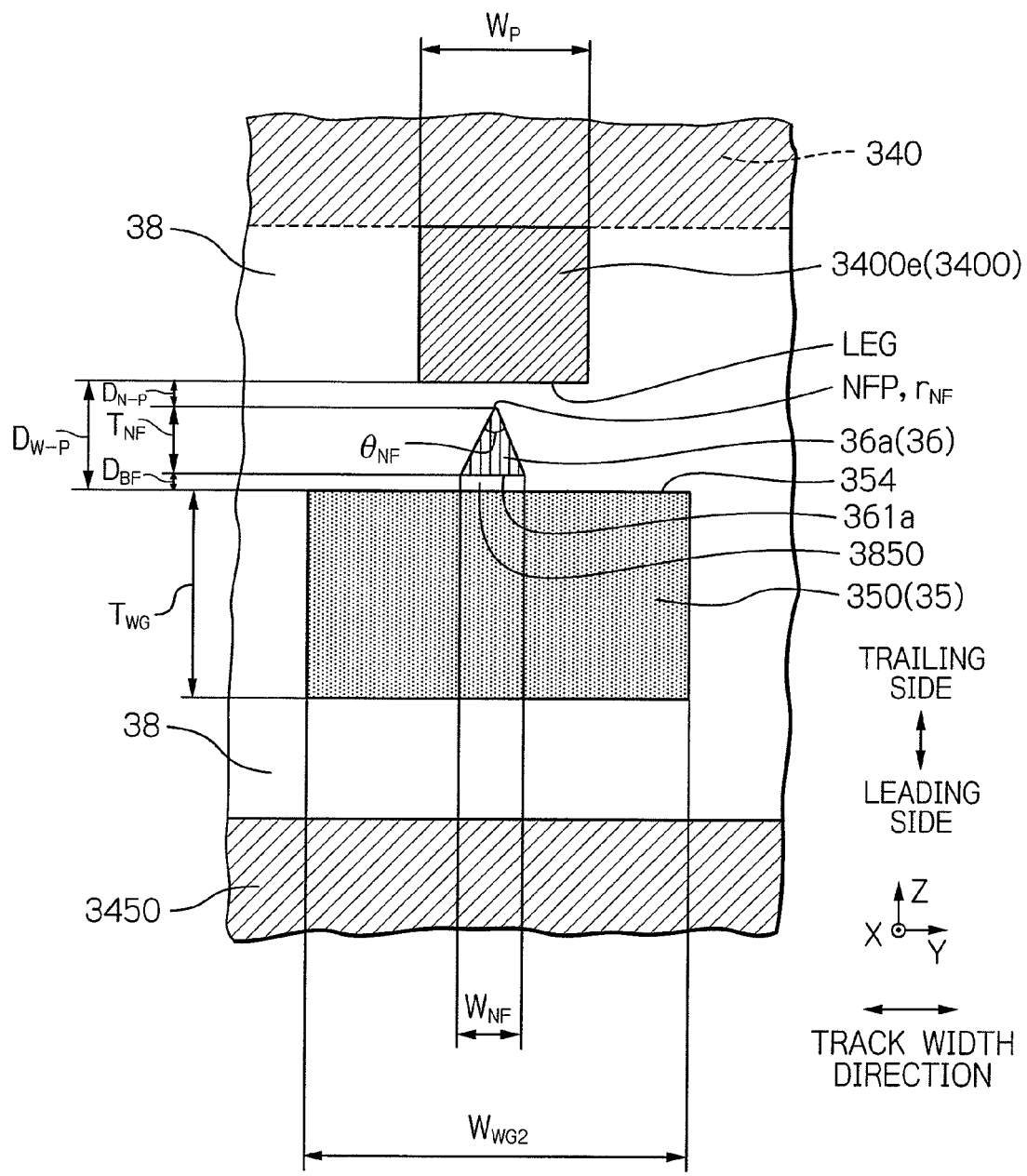
FIG. 5 shows a plain view illustrating the shapes of the end surfaces of the waveguide, the surface plasmon generator and the electromagnetic transducer on the head part end surface.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 reaches the head part end surface 2210, and the end surface 3400e of the pole 3400, which is a portion of the end surface 2210, has an edge (LEG: FIGS. 4 and 5) closest to the lower shield 3450 (most on the leading side), the edge being at a position where write field is generated. The edge LEG has a much small width $W_P$ (FIG. 5) in the track width direction (Y-axis direction), which enables a fine write field responding to higher recording density to be generated. The width $W_P$ is, for example, in the range from 0.05 μm (micrometer) to 0.5 μm. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the main magnetic pole 3400 is, for example, in the range from 0.1 to 0.8 μm.

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment. However, the write coil layer 343 may have a two or more layered structure, or may have a helical coil shape in which the upper yoke layer 340 is sandwiched therebetween. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 μm. Further, the lower shield 3450 is a magnetic shield that reaches the head part end surface 2210, being magnetically connected with the lower yoke layer 345. The lower shield 3450 is provided on the opposite side to the main magnetic pole 3400 from the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the main magnetic pole 3400 to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 3, the waveguide 35 and the surface plasmon generator 36 are provided between the lower yoke layer 345 (lower shield 3450) and an upper yoke layer 340 (main magnetic pole 3400), and form an optical system for generating NF-light in the head part 221. The waveguide 35 is provided in parallel with an element-formation surface 2202 and extends from the rear end surface 352 which is a portion of the head part rear end surface 2212 to the end surface 350 which is a portion of the head part end surface 2210. Alternatively, the end surface 350 may be recessed in +X direction from the head part end surface 2210, not reaching the end surface 2210. The surface plasmon generator 36 is located between the waveguide 35 and the main magnetic pole 3400, and includes: an opposed-to-waveguide surface 361 that is opposed to the waveguide 35 with a predetermined distance; and a propagation edge 360 that is located on the side opposite to the opposed-to-waveguide surface 361 (on the trailing side; +Z side) of the surface plasmon generator 36. The propagation edge 360 extends to a NFL-generating end surface 36a that generates NF-light, and propagates surface plasmon to the NFL-generating end surface 36a, the surface plasmon being excited by laser light (waveguide light) that has propagated through the waveguide 35.

Further, the surface plasmon generator 36 is covered with an insulating layer 385 formed of a material that has a refractive index lower than that of the constituent material of the waveguide 35. The waveguide light that has propagated through the waveguide 35 can be coupled with the surface plasmon generator 36 in a surface plasmon mode by using a portion 3850 and further other portions of the insulating layer 385 as a buffering portion, the portion 3850 of the insulating layer 385 being sandwiched between the waveguide 35 and the surface plasmon generator 36. Here, the waveguide 35, the insulating-layer portion 3850 and the surface plasmon generator 36 are arranged in an Otto configuration. The formation of the present invention utilizing the Otto configuration enables surface plasmon to be excited without significant influence to the wavenumber K of laser light (waveguide light) that propagates through the waveguide 35.

Further, the insulating layer 385 as well as the insulating layer 384 covers a portion of the waveguide 35 as a core near the head part end surface 221, and acts for a clad. In the present embodiment, the insulating layer 385, which is a portion of the overcoat layer 38, is also used as a buffering portion. Alternatively, a new layer may be provided as the buffering portion instead of the insulating layer 385. A detailed explanation of the waveguide 35, the surface plasmon generator 36 and the main magnetic pole 3400 will be given later with reference to FIG. 4. Further, as is in the present embodiment, an inter-element shield layer 39 is preferably provided between the MR element 33 and the electromagnetic transducer 34, sandwiched by the insulating layers 382 and 383. The inter-element shield layer 39 may be formed of a soft-magnetic material, and plays a role for shielding the MR element 33 from magnetic field generated from the electromagnetic transducer 34.

Also according to FIG. 3, the light source unit 23 includes: a unit substrate 230; a laser diode 40 provided on the source-installation surface 2302 of the unit substrate 230; a terminal electrode 410 electrically connected to the lower surface 401 as an electrode of the laser diode 40; and a terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the surface plasmon generator 36 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm (nanometers) to 1.7 µm. Specifically, for example, a laser diode of InGaAsP/InP quaternary mixed crystal can also be used, in which possible wavelength region is set to be from 1.2 to 1.67 µm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers for exciting the oscillation by total reflection. The reflective layer 42 has an opening in the position of the active layer 40e including the light-emission center 4000. Here, the laser diode 40 has a thickness $T_{LA}$ in the range of, for example, approximately 60 to 200 µm.

Further, an electric source provided within the magnetic disk apparatus can be used for driving the laser diode 40. In fact, the magnetic disk apparatus usually has an electric source with applying voltage in the range, for example, approximately from 2V to 5V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 µm; the length (in Z-axis direction) is 850 µm; and the thickness (in X-axis direction) is 230 µm. In the case, the light source unit 23 may be one size smaller than the slider 22, and may have a size, for example, in which the width in the track width direction is 425 µm; the length is 300 µm; and the thickness is 300 µm.

By joining the above-described light source unit 23 and slider 22, there is constituted the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

FIG. 4 shows a perspective view schematically illustrating the configuration of the waveguide 35, the surface plasmon generator 36 and the main magnetic pole 3400. In the figure, the head part end surface 2210 is positioned at the left side, the end surface 2210 including positions where write field and NF-light are emitted toward the magnetic recording medium.

Referring to FIG. 4, there are provided a waveguide 35 that propagates laser light 53 for generating NF-light and a surface plasmon generator 36 that propagates surface plasmon excited by the laser light (waveguide light) 53 propagating through the waveguide 35 and generates NF-light. In the present embodiment, the surface plasmon generator 36 includes: an opposed-to-waveguide surface 361 that is opposed to the waveguide 35 with a predetermined distance $D_{BF}$; a propagation edge 360 that is located on the side opposite to the opposed-to-waveguide surface 361 (on the trailing side; +Z side) of the surface plasmon generator 36; and a NFL-generating end surface 36a that reaches the head part end surface 2210, from which NF-light is generated. The propagation edge 360 extends to the NFL-generating end surface 36a, and acts for propagating surface plasmon to the NFL-generating end surface 36a, the surface plasmon being excited by the waveguide light 53. In the present embodiment, the surface plasmon generator 36 has substantially a shape of triangle pole extending in X-axis direction. The opposed-to-waveguide surface 361 is one of side surfaces (plain surfaces) of the triangle pole, and the propagation edge 360 is a side edge that is opposed to the one side surface. Here, the above term "substantially" means that the triangle pole as a shape of the surface plasmon generator 36 includes a generator shape in which, for example, at least one side surface becomes somewhat curved or at least one side edge is rounded with a predetermined curvature, depending on the method for forming the surface plasmon generator 36.

Further, the surface plasmon generator 36 is covered with the insulating layer 385 (FIG. 3) that has a refractive index lower than that of the constituent material of the waveguide 35. That is, the insulating layer 385 covers not only the opposed-to-waveguide surface 361 as an insulating-layer portion 3850, but also the propagation edge 360 that is located on the side opposite to the waveguide 35; the insulating layer 385 lies also between the waveguide 35 and the main magnetic pole 3400. The waveguide light that has propagated through the waveguide 35 can be coupled with the surface plasmon generator 36 in a surface plasmon mode by using the insulating layer 385 (insulating-layer portion 3850) as a buffering portion.

Here, the waveguide 35, the insulating-layer portion 3850 and the surface plasmon generator 36 are arranged in the Otto configuration. The configurations of optical systems for exciting surface plasmon by using evanescent light mainly include an Otto configuration and a Kretschmann configuration. The Otto configuration is a configuration in which a first dielectric region, a second dielectric region that has a refractive index lower than that of the first dielectric region, and a metal region are sequentially disposed from the side of the incidence of laser light, any neighboring regions having a contact with each other. Whereas, the Kretschmann configuration is a configuration in which a first dielectric region, a metal region, and a second dielectric region that has a refractive index lower than that of the first dielectric region are sequentially disposed from the side of the incidence of laser light, any neighboring regions having a contact with each other. The principles of exciting surface plasmon by utilizing the respective configurations are different from each other. As a result, these configurations realize optical formations different from each other, and provide dispersion relations of surface plasmon different from each other. The Otto configuration is explained in detail, for example, in Otto, "Excitation of Nonradiative Surface Plasma Waves in Silver by the Method of Frustrated Total Reflection", Zeitschrift fur Physik Vol. 216, pp 398-410 (1968). And the Kretschmann configuration is explained in detail, for example, in E. Kretschmann and H. Raether, "Radiative Decay of Non Radiative Surface Plasmons Excited by Light", Z. Naturforsch. Vol. 23a, pp 2135-2136 (1968).

Referring again to FIG. 4, the waveguide 35 is provided on the −z side (leading side) of the surface plasmon generator 36, that is, on the side opposite to the main magnetic pole 3400 when viewed from the waveguide 35. In this configuration, the waveguide 35 can be located at a distance from the main magnetic pole 3400 even though the end surface 3400e of the main magnetic pole 3400 that generates write field is adjacent to the NFL-generating end surface 36a that generates NF-light. This can prevent reduction in the amount of the waveguide light 53 to be converted into NF-light due to partial absorption of the waveguide light 53 into the main magnetic pole 3400 made of a metal.

The waveguide 35 may have a shape with a constant width in the track width direction (Y-axis direction), or as shown in FIG. 4, may have a portion on the head part end surface 2210 side, which has a narrower width in the track width direction (Y-axis direction). The width $W_{WG1}$ in the track width direction (Y-axis direction) of a portion of the waveguide 35 on the rear end surface 352 side may be, for example, in the range approximately from 0.5 to 200 μm, the rear end surface 352 being opposite to the head part end surface 2210 in the waveguide 35. The width $W_{WG2}$ in the track width direction (Y-axis direction) of a portion of the waveguide 35 on the end surface 350 side may be, for example, in the range approximately from 0.3 to 100 μm. And the thickness $T_{WG}$ (in Z-axis direction) of a portion on the rear end surface 352 side may be, for example, in the range approximately from 0.1 to 4 μm, and the height (length) $H_{WG}$ (in X-axis direction) may be, for example, in the range approximately from 10 to 300 μm.

Further, the side surfaces of the waveguide 35: the upper surface 354; the lower surface 353; and both the side surfaces 351 in the track width direction (Y-axis direction) have a surface contact with the overcoat layer 38 (FIG. 2), that is, the insulating layers 384 and 385 (FIG. 3). Here, the waveguide 35 is formed of a material with a refractive index $n_{WG}$ higher than a refractive index $n_{OC}$ of the constituent material of the overcoat layer 38 (insulating layers 384 and 385), made by using, for example, a sputtering method. Therefore, the surface plasmon generator 36 is covered with the insulating layer 385 (overcoat layer 38: FIG. 3) that has a refractive index $n_{OC}$ lower than a refractive index $n_{WG}$ of the constituent material of the waveguide 35. For example, in the case that the wavelength $\lambda_L$ of laser light is 600 nm and the overcoat layer 38 is formed of $SiO_2$ (silicon dioxide: n=1.5), the waveguide 35 can be formed of, for example, $Al_2O_3$ (alumina: n=1.63). Further, in the case that the overcoat layer 38 is formed of $Al_2O_3$ (n=1.63), the waveguide 35 can be formed of, for example, $SiO_XN_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 enables the propagation loss of laser light 53 to be reduced due to the excellent optical characteristics of the constituent material. Further, the existence of the waveguide 35 as a core and the overcoat layer 38 as a clad can provide total reflection conditions in all the side surfaces. As a result, more amount of laser light 53 can reach the position that is opposed to the opposed-to-waveguide surface 361 of the surface plasmon generator 36, which improves the propagation efficiency of the waveguide 35. Meanwhile, the waveguide 35 is preferably a single-mode waveguide in order to stabilize the wavenumber K of the waveguide light propagating through the waveguide 35 and to reliably excite surface plasmon. Here, the single-mode waveguide is a waveguide in which the laser light propagating within the waveguide has a beam cross-section with a shape of circle or ellipsoid, and the light intensity distribution in the cross-section is single-peaked, especially a Gaussian. Laser light propagating through the single-mode waveguide can become a stable laser light with a intended intensity even in the case that, for example, the light beam is squeezed.

The surface plasmon generator 36 is preferably made of silver (Ag) or an Ag alloy mainly containing Ag. The alloy preferably contains at least one element selected from the group consisting of palladium (Pd), gold (Au), copper (Cu), ruthenium (Ru), rhodium (Rh), and iridium (Ir). By forming the surface plasmon generator 36 from such an Ag alloy, the NF-light emission efficiency second to Ag, Ag being a material having theoretically the highest NF-light emission efficiency, can be achieved and, in addition, defects such as cracking and chipping of the propagation edge 360 can be sufficiently minimized.

As shown also in FIG. 4, the surface plasmon generator 36 preferably has a thickness $T_{NF}$ (in Z-axis direction), which is the distance between the propagation edge 360 and the opposed-to-waveguide surface 361, in the range of 90 to 200 nm as explained later, which is sufficiently smaller than the wavelength of laser light 53. The surface plasmon generator 36 also preferably has a width $W_{NF}$ in the track width direction (Y-axis direction) in the opposed-to-waveguide surface 361, the width $W_{NF}$ being sufficiently smaller than the wavelength of laser light 53. Further, the length $H_{NF}$ (in X-axis direction) of the surface plasmon generator 36 can be set to be, for example, in the range of approximately 0.3 to 6.0 μm. The length $H_{NF}$ is, in the present embodiment, a length of a buffering portion sandwiched between the side surface 354 of the waveguide 35 and the opposed-to-waveguide surface 361, and is preferably larger than the wavelength $\lambda_L$ of laser light 53. In this preferable case, the buffering portion has an area markedly larger than a so-called "focal region" in the case that, for example, laser light is converged on a buffering portion and a NF-optical device and is coupled in a surface plasmon mode. As a result, very stable coupling in the surface plasmon mode can be achieved.

FIG. 5 shows a plain view illustrating the shapes of the end surfaces of the waveguide 35, the surface plasmon generator 36 and the electromagnetic transducer 34 on the head part end surface 2210.

As shown in FIG. 5, in the electromagnetic transducer 34, the main magnetic pole 3400 and the lower shield 3450 reach the head part end surface 2210. The end surface 3400e of the main magnetic pole 3400 on the head part end surface 2210 has a shape of, for example, rectangle, square or trapezoid. The above-described width $W_P$, is equivalent to a length in the track width direction (Y-axis direction) of the edge LEG in the end surface 3400e, the edge LEG being closest to the lower shield 3450 (most on the leading side). Thus, the width $W_P$ determines the width of a track formed on a magnetic recording layer of a magnetic disk in the case of magnetic dominant recording. The width $W_P$ can be in the range, for example, approximately from 0.05 to 0.5 μm.

On the head part end surface 2210, the NFL-generating end surface 36a of the surface plasmon antenna 36 is positioned close to the end surface 3400e of the main magnetic pole 3400 and in the leading side (−Z direction side) of the end surface 3400e. Further, in the present embodiment, the NFL-generating end surface 36a has a shape of isosceles triangle in which a bottom edge 361a is on the waveguide 35 side (leading side: +Z side) and a vertex NFP on the main magnetic pole 3400 side is an end of the propagation edge 360. The distance between the vertex NFP and the bottom edge 361a, that is, the thickness $T_{NF}$ (in Z-axis direction) of the surface plasmon generator 36 is preferably in the range from 90 to 200 nm, as explained in later.

The vertex NFP as a point where NF-light is generated is located on the main magnetic pole 3400 side because the propagation edge 360 is provided on the side opposite to the waveguide 35, as described above. As a result, the vertex NFP can be disposed much close to the edge LEG where write field is generated. The distance $D_{N-P}$ between the vertex NFP and the edge LEG on the head part end surface 2210 is preferably set to a sufficiently small value of 100 nm or less. In the thermally-assisted magnetic recording according to the present invention, the vertex NFP functions as a main heating action part, and the edge LEG functions as a writing action part. Therefore, by setting the distance $D_{N-P}$ in the above-described way, write field with sufficiently large gradient can be applied to a portion of the magnetic recording layer of the magnetic disk, the portion having been sufficiently heated. This enables a stable thermally-assisted write operation to be securely achieved.

Also according to FIG. 5, the distance $D_{W-P}$ between the waveguide 35 and the main magnetic pole 3400 is expressed as the following equation (1):

$$D_{W-P} = D_{N-P} + T_{NF} + D_{BF} \quad (1)$$

where $D_{BF}$ is the distance between the waveguide 35 and the surface plasmon generator 36 (opposed-to-waveguide surface 361), and is equivalent to the thickness of the insulating layer portion 3850. It can be seen from equation (1) that a distance $D_{W-P}$ exceeding at least the thickness $T_{NF}$ can be secured even though the distance $D_{N-P}$ is set to be a much small value as described above under the condition that the distance $D_{BF}$ is set to a predetermined value in order to induce a surface plasmon mode. That is, the waveguide 35 can be located sufficiently apart from the main magnetic pole 3400 and upper yoke layer 340. As a result, there can be prevented the reduction in the amount of laser light to be converted into NF-light due to partial absorption of the laser light propagating through the waveguide 35 into the main magnetic pole 3400 or upper yoke layer 340 made of a metal.

Further, the vertex angle $\theta_{NF}$ of the vertex NFP of the NFL-generating end surface 36a is, in the present embodiment, a vertex angle of the vertex corresponding to the propagation edge 360 in the cross-section of the surface plasmon generator 36, the cross-section being taken by the plane perpendicular to the propagation edge 360 (YZ-plane). The vertex angle $\theta_{NF}$ is preferably in the range from 20 to 70 degrees (°) as explained layer. Furthermore, the propagation edge 360 is rounded to prevent the reduction in light use efficiency due to the running off of the surface plasmon from the propagation edge 360. The vertex radius (curvature radius) $r_{NF}$ is preferably set to be in the range from 7 to 20 nm, as described later. The appropriate setting of the vertex angle $\theta_{NF}$ and vertex radius $r_{NF}$ enables NF-light with a sufficiently high intensity to be generated at the vertex NFP.

The above-described distance $D_{N-P}$ between the vertex NFP and the edge LEG, that is, between the propagation edge 360 and the main magnetic pole 3400 in the present embodiment, is preferably set to be a value of the vertex radius $r_{NF}$ or more, and to be 100 nm or less. The surface plasmon propagating on the propagation edge 360 toward the vertex NFP is found to be spread in the range of approximately the same distance as the vertex radius $r_{NF}$ from the propagation edge 360. Therefore, it is understood that the main magnetic pole 3400 is preferably at a distance from the propagation edge 360 by setting the distance $D_{N-P}$ to be a value of the vertex radius $r_{NF}$ or more in order to avoid the increase in propagation loss of surface plasmon due to the absorption of the surface plasmon into the main magnetic pole 3400.

Figure 6A:
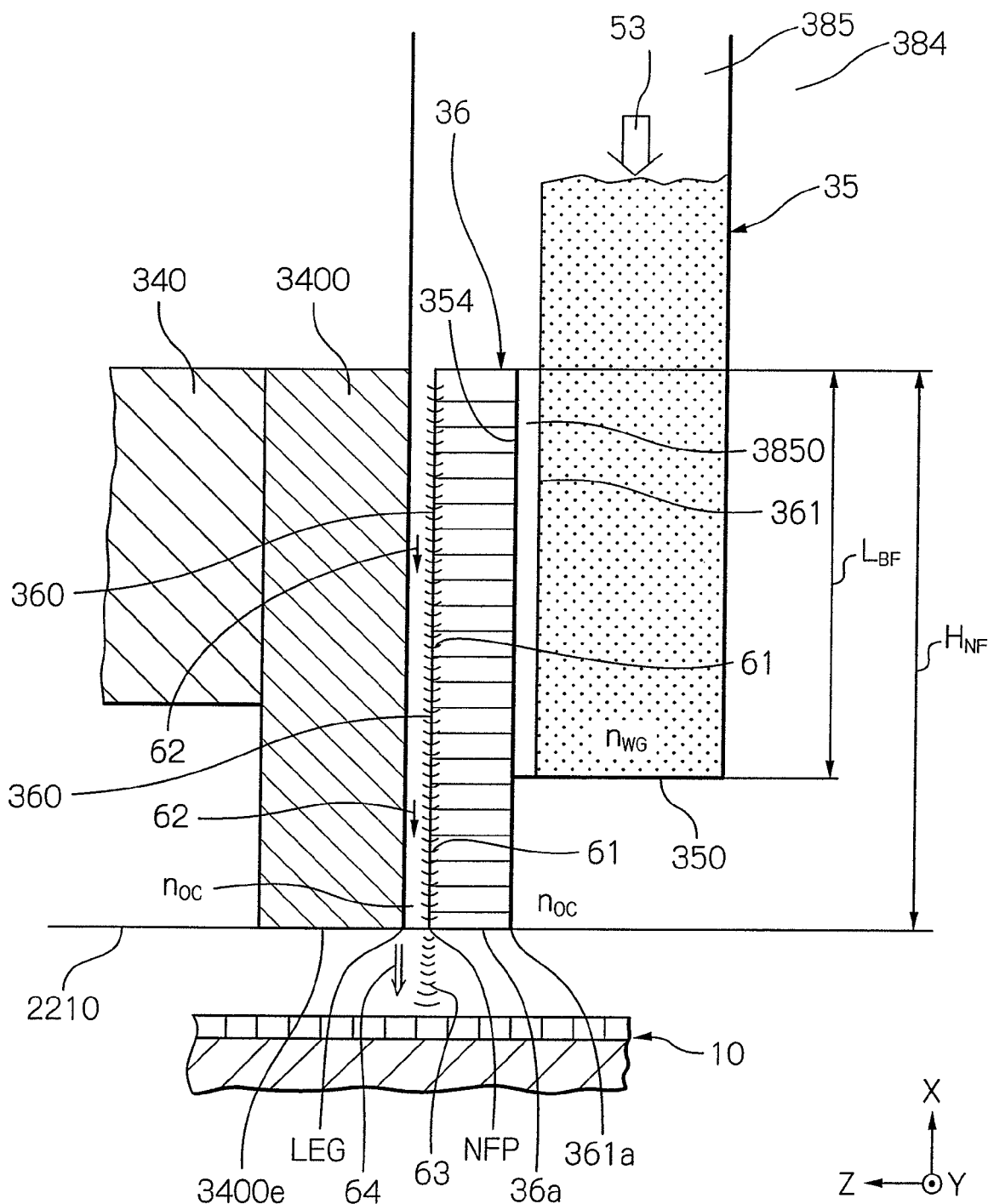

FIGS. 6a and 6b show schematic views for explaining the thermally-assisted magnetic recording utilizing a surface plasmon mode according to the present invention. FIG. 6a is a cross-sectional view taken by ZX-plane, and FIG. 6b is a cross-sectional view taken by YZ-plane. Further, in FIG. 6a, the end surface 350 of the waveguide 35 is recessed in +X direction from the head part end surface 2210, not reaching the end surface 2210, as an alternative to the embodiment shown in FIG. 4. However, the principle of thermally-assisted magnetic recording explained below apples to the respective embodiments shown in FIG. 4 and FIG. 6a.

Referring to FIG. 6, when the electromagnetic transducer 34 writes data onto the magnetic recording layer of the magnetic disk 10, first, laser light 53 emitted from the laser diode 40 of the light source unit 23 propagates through the waveguide 35. Next, the laser light (waveguide light) 53, which has advanced to near the opposed-to-waveguide surface 361 of the surface plasmon generator 36, is coupled with the optical configuration including the waveguide 35 with a refractive index $n_{WG}$, the buffering portion (insulating layer portion 3850, insulating layer 385) with a refractive index $n_{OC}$, and the surface plasmon generator 36 made of a conductive material such as a metal, and induces a surface plasmon mode in the surface plasmon generator 36. That is, the waveguide light couples with the surface plasmon generator 36 in a surface plasmon mode. This surface plasmon mode can be induced by setting the refractive index $n_{OC}$ of the buffering portion to be smaller than the refractive index $n_{WG}$ of the waveguide 35 ($n_{OC} < n_{WG}$).

The structure of sequentially stacking the waveguide 35 made of a dielectric material having a refractive index $n_{WG}$, the insulating layer portion 3850 made of a dielectric material having a refractive index $n_{OC}$ ($n_{OC} < n_{WG}$), and the surface plasmon generator 36 made of a conductive material such as a metal constitutes Otto configuration; based on this configuration, surface plasmon is excited. Actually, as shown in FIG. 6b, evanescent light 65 is excited within the buffering portion based on the optical boundary condition between the waveguide 35 and the buffering portion (insulating layer portion 3850, insulating layer 385), the evanescent light 65 being a part of waveguide light 53 seeping out from the boundary (side surface 354) of the waveguide 35. Then, the evanescent light couples with the fluctuation of electric charge excited on the metal surface of the surface plasmon generator 36, and induces a surface plasmon mode, and thus surface plasmon is excited. To be exact, there excited is surface plasmon polariton in this system because surface plasmon as elementary excitation is coupled with an electromagnetic wave. However, the surface plasmon polariton will be hereinafter referred to as surface plasmon for short.

As shown also in FIG. 6b, the surface plasmon excited on the side surfaces 362 and opposed-to-waveguide surface (bottom surface) 361 of the surface plasmon generator 36 also induces a surface plasmon mode, as shown by arrows 66, in the propagation edge 360 that is an edge having the smallest acute-angle, as the surface plasmon proceeds in the direction toward the NFL-generating end surface 36a (in –X direction). As a result, by appropriately setting the size and shape of the surface plasmon generator 36 as described above, most of the excited surface plasmon can be propagated on the propagation edge 360. Here, the length $L_{BF}$ of the insulating layer portion 3850 sandwiched between the upper surface (side surface) 354 of the waveguide 35 and the opposed-to-waveguide surface 361 is also one of important parameters for inducing the surface plasmon mode.

The formation of the present invention that utilizes the Otto configuration enables without significant influence to the wavenumber K of laser light (waveguide light) that propagates through the waveguide 35. As a result, there can be kept a high-level coupling between the waveguide light and the surface plasmon. Further, thus, there can be kept a low propagation loss of the waveguide light. Furthermore, there is no need for the generated evanescent light to distribute in the range that covers most of the surface plasmon generator 36 because the surface plasmon gathers on the propagation edge 360 with the transfer of surface plasmon toward the direction shown by arrows 66 described above. Therefore, the size of surface plasmon generator 36 can be set to be considerably large. As a result, there can be suppressed excessive thermal expansion of the generator 36 due to the generation of heat during generating NF-light.

Backing to FIG. 6a, the excited surface plasmon 61 propagates along on the edge 360 in the direction shown by arrow 62. The destination of propagation edge 360 is the vertex NFP of the NFL-generating end surface 36a, then the surface plasmon 61 propagating on the edge 360, namely, electric field converges at the vertex NFP. As a result, NF-light 63 is emitted from the vertex NFP. The NF-light 63 is radiated toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 64 generated from the main magnetic pole 3400 is applied to the portion to perform write operation. Thus, the thermally-assisted magnetic recording can be achieved.

Further, as described above, the surface plasmon generator 36 can generate the NF-light 63 more intensively at the vertex NFP that is on the main magnetic pole 3400 side. In this way, by intentionally propagating surface plasmon on the propagation edge 360 and then generating the NF-Light 63 with maximum intensity at the vertex NFP, the emitting position of NF-light 63 can be set to be maximally close to the edge LEG where write field 64 is generated. This enables a write field having a sufficiently large gradient to be applied to a sufficiently heated portion in the magnetic recording layer of the magnetic disk 10. Consequently, a thermally-assisted, stable write operation can be reliably performed.

Meanwhile, in a conventional case in which a NF-optical device provided on the end surface of a head is directly irradiated with a laser light propagating through a waveguide, most of the irradiating laser light has been converted into thermal energy within the NF-optical device. In this case, the size of the NF-optical device has been set smaller than the wavelength of the laser light, and its volume is very small. Therefore, the NF-optical device has been brought to a very high temperature, for example, 500° C. (degrees Celsius) due to the thermal energy. As a result, there has been a problem that the end of a read head element, which reaches the opposed-to-medium surface, becomes relatively far apart from the magnetic disk due to the thermal expansion of the NF-optical device, which makes it difficult to properly read servo signals during recording operations. Further, there has been another problem that the light use efficiency is degraded because thermal fluctuation of free electrons increases in the NF-optical device.

On the contrary, in the thermally-assisted magnetic recording according to the present invention, a surface plasmon mode is used, NF-light 63 is generated by propagating surface plasmon 61 toward the head part end surface 2210. This brings the temperature at the NFL-generating end surface 36a to, for example, about 100° C. during the emission of NF-light, the temperature being drastically reduced compared to the conventional. Thus, this reduction of temperature allows the protrusion of the NFL-generating end surface 36a toward the magnetic disk 10 to be suppressed; thereby favorable thermally-assisted magnetic recording can be achieved.

Furthermore, in the head 21 according to the present invention, the length $L_{BF}$ (length $H_{NF}$ in the embodiment shown in FIG. 4) of the portion through which the waveguide 35 and the surface plasmon generator 36 are coupled with each other in a surface plasmon mode, is preferably larger than the wavelength $\lambda_L$ of laser light 53. In this preferable case, the coupled portion has an area markedly larger than a so-called "focal region" in the case that, for example, laser light is converged on a buffering portion and a surface plasmon generator and coupled in a surface plasmon mode. Therefore, the configuration quite different from the system including such "focal region" can be realized in the present invention; thus, very stable coupling in the surface plasmon mode can be achieved. The induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. Nos. 7,330,404 B2, and 7,454,095 B2.

Figure 7A:
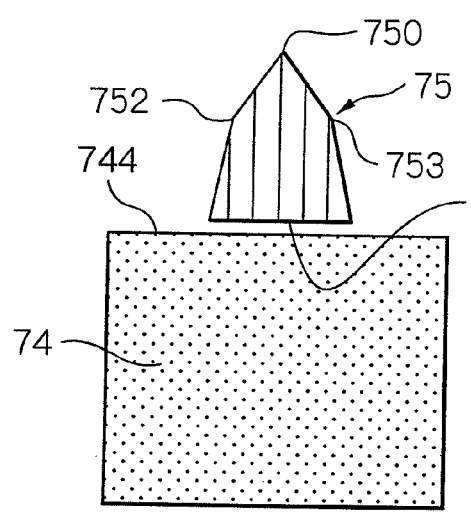
FIGS. 7a and 7b show schematic views illustrating other embodiments regarding the NFL-generating optical system according to the present invention.
Figure 7B:
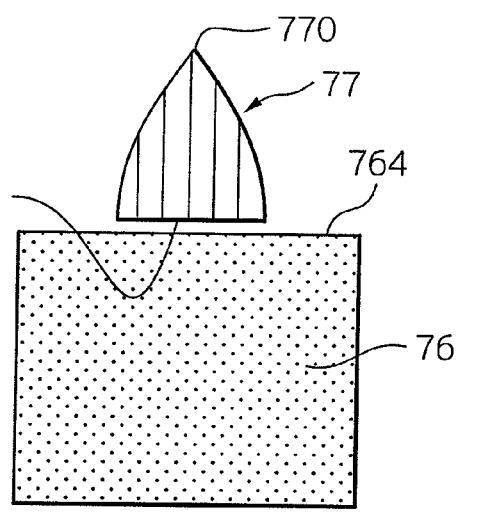

FIGS. 7a and 7b show schematic views illustrating other embodiments regarding the NFL-generating optical system according to the present invention. These figures are cross-sections taken by YZ-plane.

Referring to FIG. 7a, a surface plasmon generator 75 includes an opposed-to-waveguide surface 751, a propagation edge 750 and two side edges 752 and 753 (in X-axis direction). The opposed-to-waveguide surface 751 is apart with a predetermined distance from the upper surface (side surface) 744 of a waveguide 74. Also in this configuration, surface plasmon is excited most intensively and the most amount of surface plasmon propagates on the propagation edge 750 that has the smallest vertex angle on the cross-section taken by YZ-plane. The two side edges 752 and 753 have larger vertex angles (obtuse angles in the figure) on the cross-section; surface plasmon hardly gathers and propagates on the side edges.

Referring to FIG. 7b, a surface plasmon generator 77 includes an opposed-to-waveguide surface 771, a propagation edge 770 and side surfaces a part of which is curved. The propagation edge 770 is the only side edge extending along X-axis direction that has a vertex on the cross-section, except side edges as end edges of the opposed-to-waveguide surface 771. The opposed-to-waveguide surface 771 is apart with a predetermined distance from the upper surface (side surface) 764 of a waveguide 76. Also in this configuration, surface plasmon is excited most intensively and the most amount of surface plasmon propagates on the propagation edge 770 that only has a vertex angle except both end edges of the opposed-to-waveguide surface 771, on the cross-section taken by YZ-plane. The two side edges 752 and 753 have larger vertex angles (obtuse angles in the figure) on the cross-section; surface plasmon hardly gathers and propagates on the side edges.

In the embodiments shown in FIGS. 7a and 7b, it is understood that surface plasmon can be gathered on the propagation edge disposed on the side opposite to the waveguide and thus can be propagated intensively on the propagation edge. As a result, NF-light can be generated intensively in a minute area adjacent to the main magnetic pole provided on the side opposite to the waveguide when viewed from the surface plasmon generator. Therefore, a satisfactory thermally-assisted magnetic recording can be performed.

Hereinafter, practical examples will be described in which the generation of NF-light in a NFL-generating optical system according to the present invention was analyzed in simulations.

Figure 8:
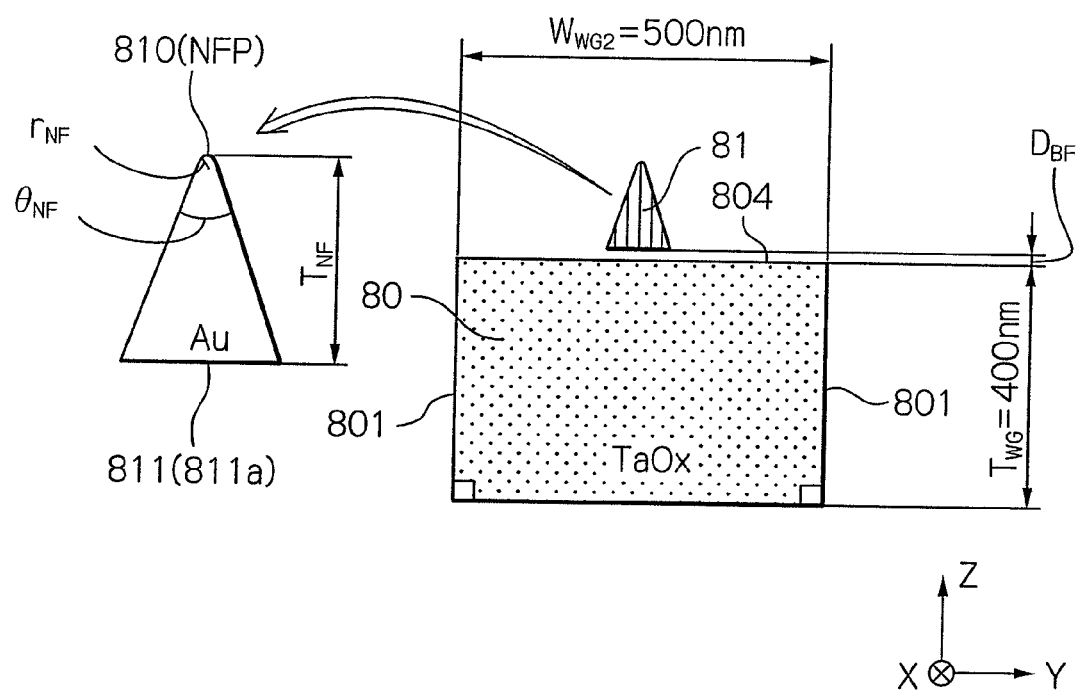
FIG. 8 shows a cross-sectional view illustrating a system used in the simulation performed as practical examples.

FIG. 8 shows a cross-sectional view illustrating a system used in the simulation performed as practical examples.

In the practical examples described below, the intensity distribution of NF-light generated in the NFL-generating end surface of the surface plasmon generator 81 shown in FIG. 8 was examined by simulation. Specifically, the distribution of evanescent light generated around the waveguide 80, the state of surface plasmon excited in the surface plasmon generator 81, and the intensity distribution of NF-light generated in the NFL-generating end surface were calculated in simulation analysis experiments conducted by using three-dimensional Finite-Difference Time-Domain (FDTD) method, which is an electromagnetic field analysis.

In FIG. 8, laser light entering the waveguide 80 was a TM-polarized Gaussian beam having a wavelength $\lambda_L$ of 825 nm, the TM-polarization having the electric-field oscillation direction of the laser light perpendicular to the upper surface 804, that is, in Z-axis direction. The intensity $I_{IN}$ of the laser light was $1.0$ $(V/m)^2$. The waveguide 80 had a cross-section taken by YZ-plane with a rectangular shape, and had a width $W_{WGZ}$ of 500 nm and a thickness $T_{WG}$ in Z-axis direction of 400 nm. Further, the opposed-to-waveguide surface 811 of the surface plasmon generator 81 and the upper surface 804 of the waveguide 80 were opposed with each other with a predetermined distance $D_{BF}$, and the surface plasmon generator 81 was located at the center in track width direction (Y-axis direction) on the upper surface 804. The propagation edge 810 of the surface plasmon generator was rounded, and the vertex radius (curvature radius) of the rounded edge was $r_{NF}$. Further, the vertex angle was $\theta_{NF}$. The waveguide 80 was formed of $TaO_x$ (with a refractive index $n_{WG}$=2.15), and the surface plasmon generator 81 was formed of Ag.

The real part of the refractive index of the Ag was 0.223 and the imaginary part was 5.080. The waveguide 80 and the surface plasmon generator 81 were covered with $Al_2O_3$ (alumina: refractive index $n_{OC}$=1.65) that acts as a buffering portion and a clad.

(Intensity Distribution (Intensity Ratio) of NFL-Light Generated in NFL-Generating End Surface)

First, the intensity distribution of NF-light generated in the NFL-generating end surface of the surface plasmon generator 81 was examined by simulation. The system and condition of the simulation were the same as those shown in FIG. 8 described above. Here, the distance $D_{BF}$ between the waveguide 80 and the surface plasmon generator 81 was 50 nm. Further, the vertex radius $r_{NF}$ was 15 nm, and the vertex angle $\theta_{NF}$ was 40° (degrees).

Figure 9:
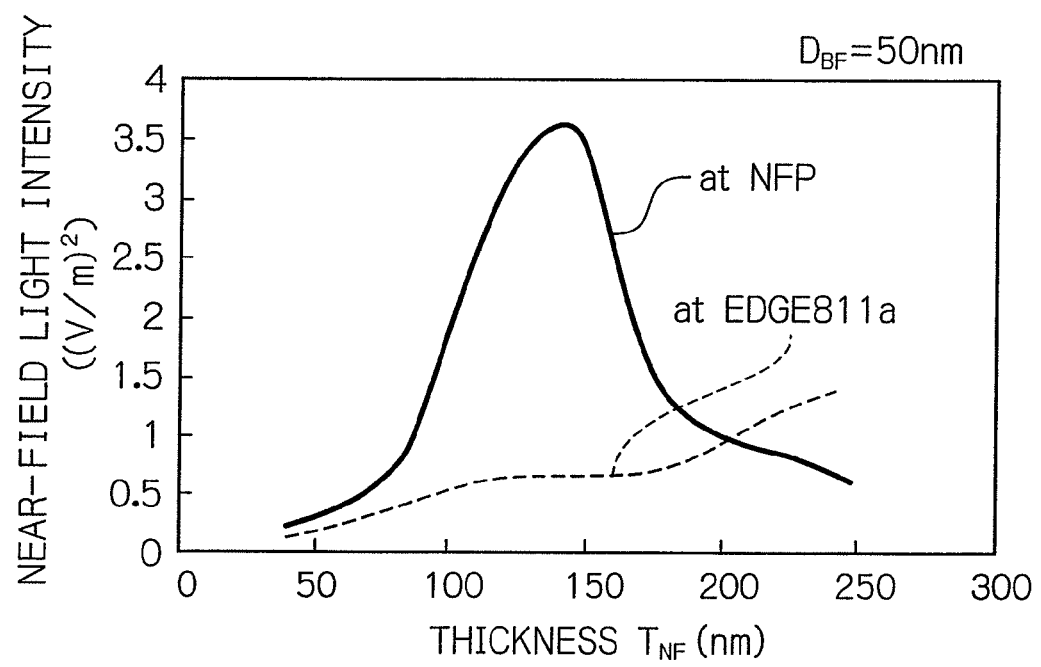
FIG. 9 shows a graph illustrating the relation between the thickness $T_{NF}$ of the surface plasmon generator and the intensities of NF-light generated at the vertex NFP and the edge on the waveguide side of the NFL-generating end surface.

FIG. 9 shows a graph illustrating the relation between the thickness $T_{NF}$ of the surface plasmon generator 81 and the intensities of NF-light generated at the vertex NFP and the edge on the waveguide side of the NFL-generating end surface. In the graph, the NF-light intensity is represented by a value at a position on the surface of magnetic recording layer that is at a distance of 6 nm in –X direction from the NFL-generating end surface.

As shown in FIG. 9, the intensity ratio of NF-lights generated at respective vertex NFP and both ends of edge 811a exceeds five at the thickness $T_{NF}$=145 nm where the NF-light intensity becomes maximized in the vertex NFP. The intensity ratio is sufficient for heating only the desired position in thermally-assisted magnetic recording. Thus, it is understood that NF-light can be generated intensively at the desired position of vertex NFP in the NFL-generating end surface of the surface plasmon generator 81. As a result, there can be achieved a thermally-assisted magnetic recording in which only the desired positions can be heated sufficiently without heating the unwanted portion on the magnetic recording medium.

(Thickness $T_{NF}$ Dependence of NF-Light Intensity)

Next, the dependence of NF-light intensity generated in the NFL-generating end surface on the thickness $T_{NF}$ of the surface plasmon generator 81 was examined by simulation. The system and condition of the simulation were the same as those shown in FIG. 8 described above. Here, the distance $D_{BF}$ between the waveguide 80 and the surface plasmon generator 81 was 50 nm. Further, the vertex radius $r_{NF}$ was 15 nm, and the vertex angle $\theta_{NF}$ was 40° (degrees).

Figure 10:
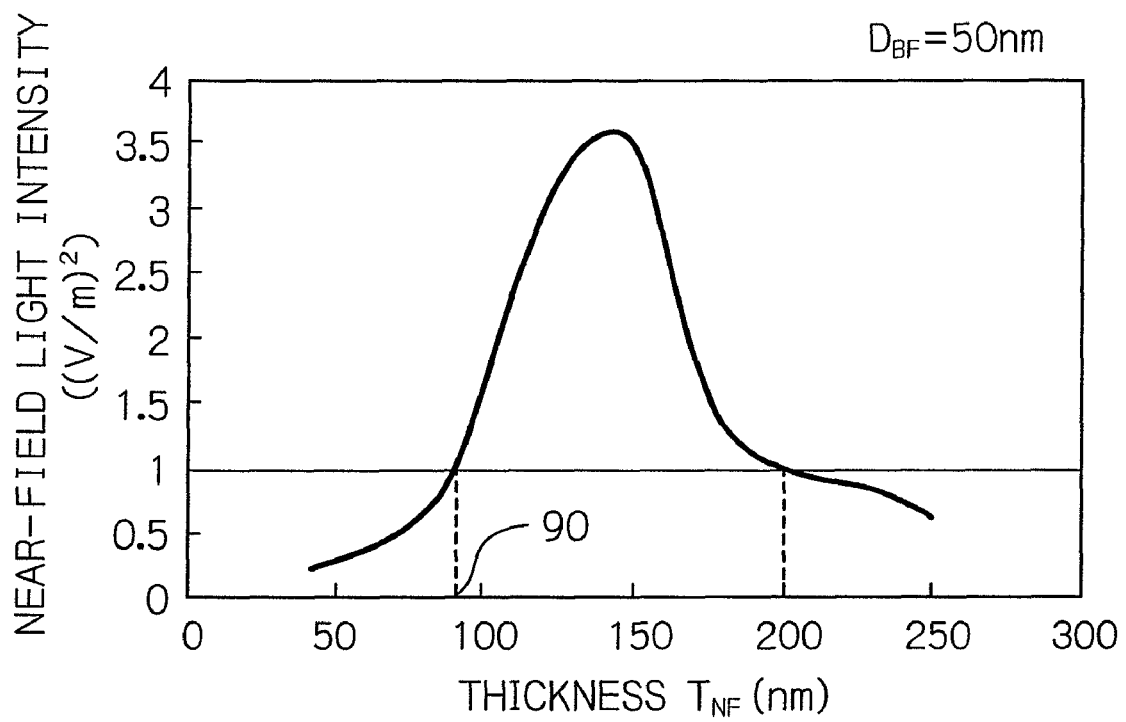
FIG. 10 shows a graph illustrating the relation, obtained by simulation, between the thickness $T_{NF}$ and the intensity of NF-light generated at the vertex NFP.

FIG. 10 shows a graph illustrating the relation between the thickness $T_{NF}$ and the intensity of NF-light generated at the vertex NFP. In the graph, the NF-light intensity is also represented by a value at a position on the surface of magnetic recording layer that is at a distance of 6 nm in –X direction from the NFL-generating end surface.

As shown in FIG. 10, it is found that, when the thickness $T_{NF}$ is in the range from 90 nm to 200 nm, the intensity of NF-light generated at the vertex NFP is equal to or higher than the intensity $I_{IN}$ (1.0 (V/m)$^2$) of laser light entering the waveguide 80. Therefore, it is understood that the thickness $T_{NF}$ is preferably in the range from 90 nm to 200 nm in order to obtain an output intensity that is equal to or higher than the intensity of laser light as an input. Here, it should be noticed that, in the above-described range of thickness $T_{NF}$, the intensity of NF-light generated at the vertex NFP exceeds the intensity of NF-light generated at both ends of the edge 811a, as shown in FIG. 9.

(Vertex Angle $\theta_{NF}$ Dependence of NF-Light Intensity)

Next, the dependence of NF-light intensity generated in the NFL-generating end surface on the vertex angle $\theta_{NF}$ of the surface plasmon generator 81 was examined by simulation. The system and condition of the simulation were the same as those shown in FIG. 8 described above. Here, the distance $D_{BF}$ between the waveguide 80 and the surface plasmon generator 81 was 50 nm. Further, the vertex radius $r_{NF}$ was 15 nm, and the thickness $T_{NF}$ was 140 nm.

Figure 11:
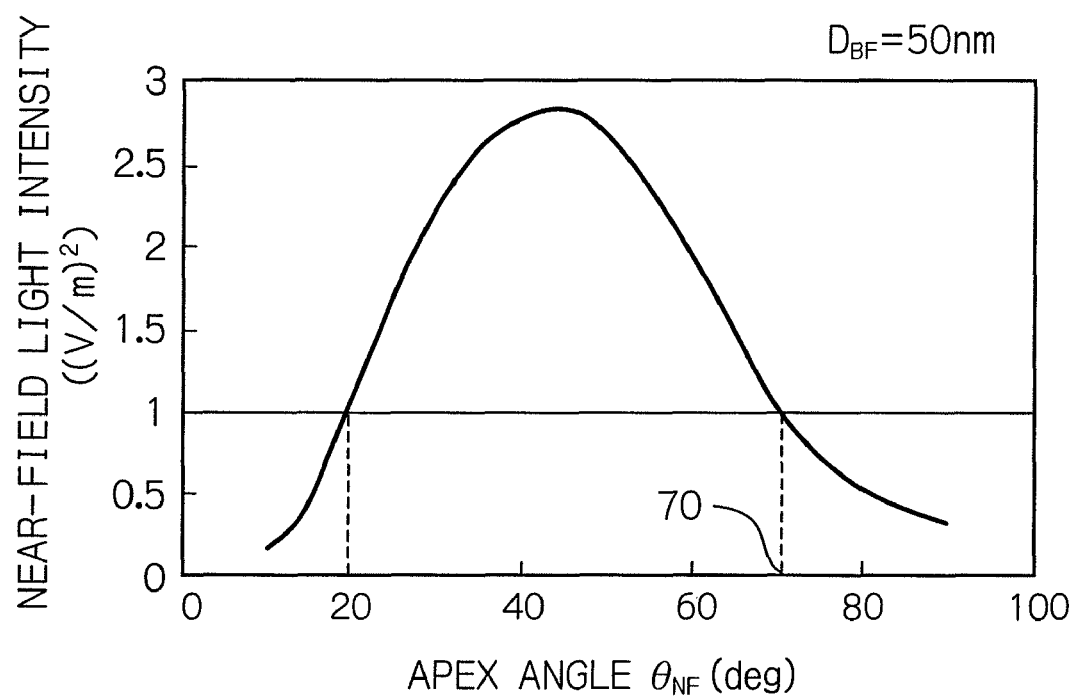
FIG. 11 shows a graph illustrating the relation, obtained by simulation, between vertex angle $\theta_{NF}$ and the intensity of NF-light generated at the vertex NFP.

FIG. 11 shows a graph illustrating the relation between vertex angle $\theta_{NF}$ and the intensity of NF-light generated at the vertex NFP. In the graph, the NF-light intensity is also represented by a value at a position on the surface of magnetic recording layer that is at a distance of 6 nm in –X direction from the NFL-generating end surface.

As shown in FIG. 11, it is found that, when the vertex angle $\theta_{NF}$ is in the range from 20° to 70° (degrees), the intensity of NF-light generated at the vertex NFP is equal to or higher than the intensity $I_{IN}$ (1.0 (V/m)$^2$) of laser light entering the waveguide 80. Therefore, it is understood that the vertex angle $\theta_{NF}$ is preferably in the range from 20° to 70° in order to obtain an output intensity that is equal to or higher than the intensity of laser light as an input.

(Vertex Radius $r_{NF}$ Dependence of NF-Light Intensity)

Next, the dependence of NF-light intensity generated in the NFL-generating end surface on the vertex radius $r_{NF}$ of the surface plasmon generator 81 was examined by simulation. The system and condition of the simulation were the same as those shown in FIG. 8 described above. Here, the distance $D_{BF}$ between the waveguide 80 and the surface plasmon generator 81 was 50 nm. Further, the thickness $T_{NF}$ was 140 nm, and the vertex angle $\theta_{NF}$ was 40° (degrees).

Figure 12:
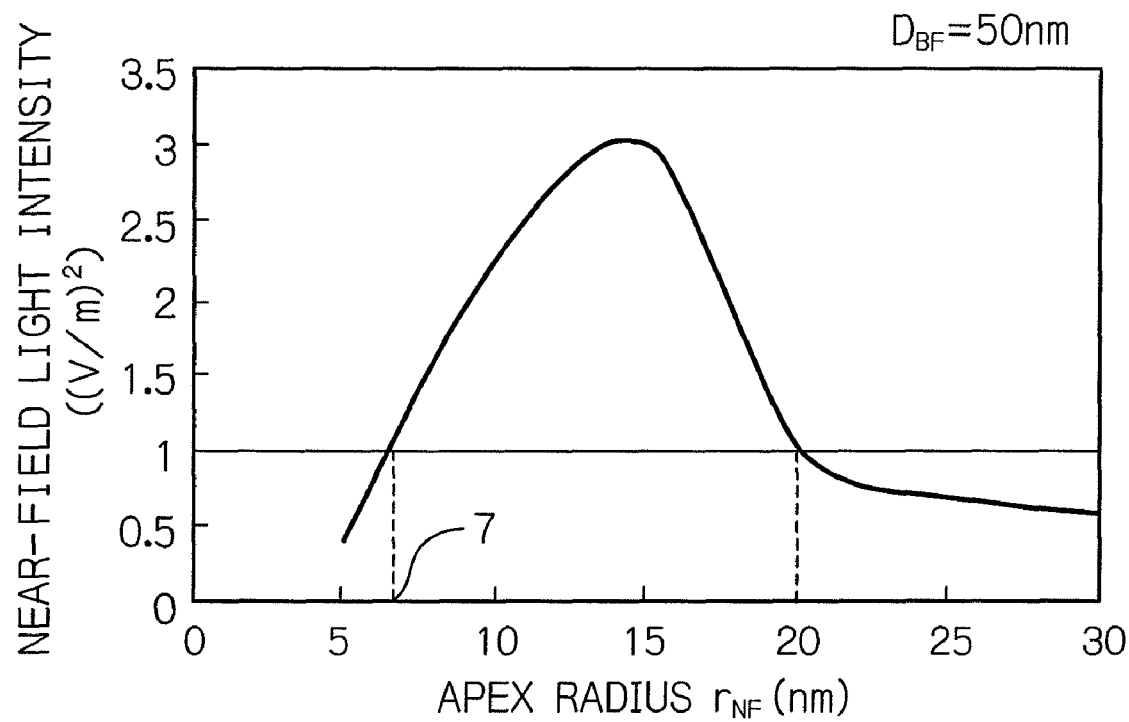
FIG. 12 shows a graph illustrating the relation, obtained by simulation, between vertex radius $r_{NF}$ and the intensity of NF-light generated at the vertex NFP.

FIG. 12 shows a graph illustrating the relation between vertex radius $r_{NF}$ and the intensity of NF-light generated at the vertex NFP. In the graph, the NF-light intensity is also represented by a value at a position on the surface of magnetic recording layer that is at a distance of 6 nm in –X direction from the NFL-generating end surface.

As shown in FIG. 12, it is found that, when the vertex radius $r_{NF}$ is in the range from 7 nm to 20 nm, the intensity of NF-light generated at the vertex NFP is equal to or higher than the intensity $I_{IN}$ (1.0 (V/m)$^2$) of laser light entering the waveguide 80. Therefore, it is understood that the vertex radius $r_{NF}$ is preferably in the range from 7 to 20 nm in order to obtain an output intensity that is equal to or higher than the intensity of laser light as an input.

(Distance $D_{BF}$ Dependence of NF-Light Intensity)

Next, the dependence of NF-light intensity generated in the NFL-generating end surface on the distance $D_{BF}$ between the waveguide 80 and the surface plasmon generator 81 was examined by simulation. The system and condition of the simulation were the same as those shown in FIG. 8 described above. Here, the thickness $T_{NF}$ was 140 nm, the vertex angle $\theta_{NF}$ was 40° (degrees), and the vertex radius $r_{NF}$ was 15 nm.

Figure 13:
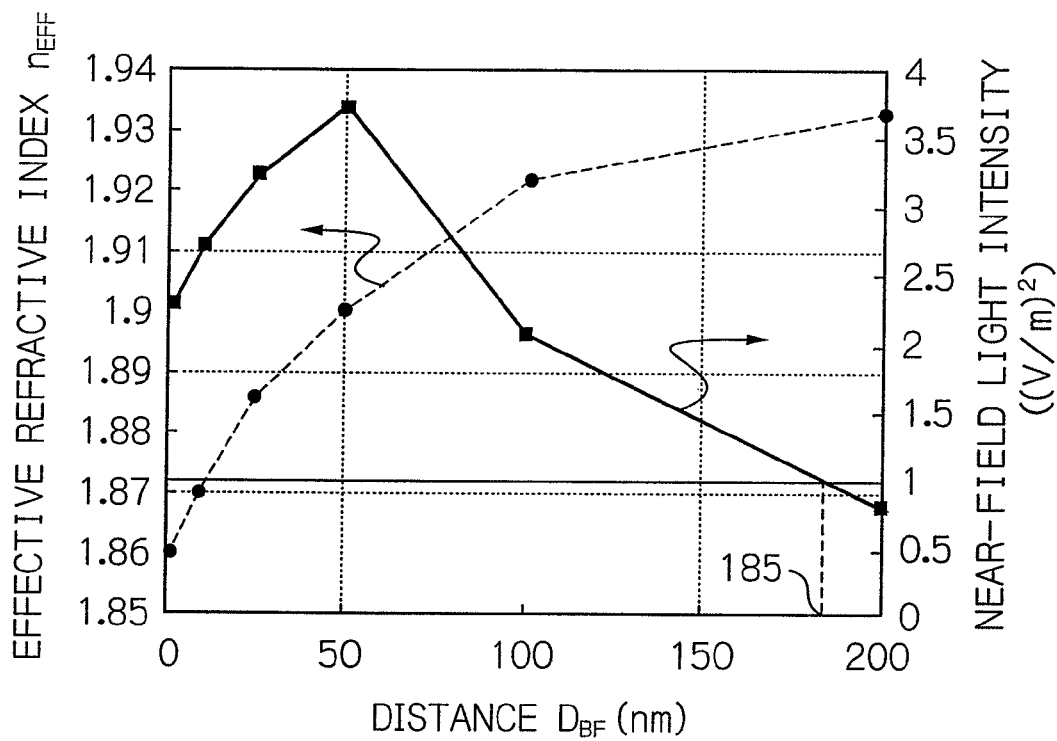
FIG. 13 shows a graph illustrating the relations, obtained by simulation, between the distance $D_{BF}$ and the effective refractive index $n_{EFF}$ of waveguide light by which a surface plasmon mode is induced and between the distance $D_{BF}$ and the intensity of NF-light generated at the vertex NFP.

Table 1 shows the relations between the distance $D_{BF}$ (FIG. 8) and the effective refractive index $n_{EFF}$ of waveguide light by which a surface plasmon mode is induced and between the distance $D_{BF}$ and the intensity of NF-light generated at the vertex NFP. And FIG. 13 shows a graph illustrating the relations presented in Table 1. The effective refractive index $n_{EFF}$ of waveguide light is defined as a ratio $K_{WG}/K_{VC}$. Here, $K_{VC}$ is a wavenumber in vacuum of laser light that enters the waveguide 80, and $K_{WG}$ is a wavenumber of the laser light within the waveguide 80. Thus, the effective refractive index $n_{EFF}$ is equivalent to a normalized wavenumber of waveguide light. Further, in the table and graph, the NF-light intensity is also represented by a value at a position on the surface of magnetic recording layer that is at a distance of 6 nm in –X direction from the NFL-generating end surface.

TABLE 1

| Distance $D_{BF}$ (nm) | Effective refractive index $n_{EFF}$ | NF-light intensity ((V/m)$^2$) |
| --- | --- | --- |
| 2 | 1.86 | 2.26 |
| 10 | 1.87 | 2.71 |
| 25 | 1.89 | 3.22 |
| 50 | 1.90 | 3.70 |
| 100 | 1.92 | 2.06 |
| 200 | 1.93 | 0.81 |

As shown in Table 1 and FIG. 13, it is found that, when the distance $D_{BF}$ is in the range from 2 nm to 185 nm, the intensity of NF-light generated at the vertex NFP is equal to or higher than the intensity $I_{IN}$ (1.0 (V/m)$^2$) of laser light entering the waveguide 80. Therefore, it is understood that the distance $D_{BF}$ is preferably 185 nm or less in order to obtain an output intensity that is equal to or higher than the intensity of laser light as an input.

As shown also in Table 1 and FIG. 13, it is found that the effective refractive index $n_{EFF}$ of waveguide light, that is, the wavenumber $K_{WG}$ of the waveguide light by which a surface plasmon mode is induced depends on the distance $D_{BF}$. The wavenumber $K_{WG}$ is a significantly important value on the occasion of designing a NFL-generating optical system capable of exciting a sufficient amount of surface plasmon. Thus, The wavenumber $K_{WG}$ must be appropriately set to a desired value. Therefore, the distance $D_{BF}$, that is, the thickness of the insulating layer portion sandwiched between the waveguide 80 and the surface plasmon generator 81 is required to be controlled with a sufficiently high accuracy. To realize the sufficiently high accuracy in the actual head manufacturing, the deposition process of the insulating layer portion is required to proceed to a certain extent; actually, the distance $D_{BF}$ needs to be at least 2 nm. To conclude, it is understood that the distance $D_{BF}$ is preferably 2 nm or more, and 185 nm or less. Further, in the case that the distance $D_{BF}$ is in the range from 2 nm to 100 nm, there is obtained the output intensity two times or more higher than the intensity of laser light as an input. Therefore, it is understood that the distance $D_{BF}$ is preferably 2 nm or more, and 100 nm or less.

As described above, according to the present invention, NF-light with a remarkably high intensity can be generated only at the vertex NFP on the NFL-generating end surface of the surface plasmon generator, the vertex NFP being located on the side opposite to the waveguide. That is to say, the only point that generates NF-light with a sufficiently high intensity can be provided sufficiently close to the end surface of a magnetic pole that generates write field, without laying a waveguide therebetween. As a result, it is understood that there can be provided a thermally-assisted magnetic recording head that can appropriately heat a portion to be written on the magnetic recording medium. Thus, a satisfactory thermal-assisted magnetic recording can be achieved, which contributes to the achievement of higher recording density, for example, exceeding 1 Tbits/in$^2$.

All the foregoing embodiments are by way of example of the present invention only and not intended to be limiting, and many widely different alternations and modifications of the present invention may be constructed without departing from the spirit and scope of the present invention. Especially, the NFL-generating optical system according to the present invention that includes a NF-optical device utilizing a surface plasmon mode can be applied to optical devices with greatly minute optical paths such as ultra-high-speed light modulation devices. Accordingly, the present invention is limited only as defined in the following claims and equivalents thereto.

The invention claimed is:

1. A thermally-assisted magnetic recording head comprising:
   a waveguide through which a light for exciting surface plasmon propagates;
   a near-field optical device configured to be coupled with the light in a surface plasmon mode and to emit near-field light from a near-field-light-generating end surface that forms a portion of an opposed-to-medium surface; and
   a magnetic pole for generating write field from its end on the opposed-to-medium surface side,
   the near-field optical device comprising: an opposed-to-waveguide surface opposed to the waveguide with a predetermined distance; and a propagation edge provided on a side opposite to the opposed-to-waveguide surface, extending to the near-field-light-generating end surface, and configured to propagate thereon the surface plasmon excited by the light.

2. The thermally-assisted magnetic recording head as claimed in claim 1, wherein the near-field optical device has substantially a shape of triangle pole, and the opposed-to-waveguide surface is one of side surfaces of the triangle pole, and the propagation edge is a side edge that is opposed to the one side surface.

3. The thermally-assisted magnetic recording head as claimed in claim 1, wherein a distance between the opposed-to-waveguide surface and the propagation edge is 90 nanometers or more, and 200 nanometers or less.

4. The thermally-assisted magnetic recording head as claimed in claim 1, wherein a vertex angle of a vertex corresponding to the propagation edge in a cross-section of the near-field optical device is 20 degrees or more, and 70 degrees or less, the cross-section being taken by a plane perpendicular to the propagation edge.

5. The thermally-assisted magnetic recording head as claimed in claim 1, wherein the propagation edge is rounded.

6. The thermally-assisted magnetic recording head as claimed in claim 5, wherein a vertex radius of the rounded propagation edge is 7 nanometers or more, and 20 nanometers or less.

7. The thermally-assisted magnetic recording head as claimed in claim 1, wherein a distance between the waveguide and the near-field optical device is 2 nanometers or more, and 185 nanometers or less.

8. The thermally-assisted magnetic recording head as claimed in claim 1, wherein the near-field optical device is formed of a silver alloy that contains at least one element selected from a group of palladium, gold, copper, ruthenium, rhodium and iridium.

9. The thermally-assisted magnetic recording head as claimed in claim 1, wherein the near-field optical device is provided between the waveguide and the magnetic pole in such a way that the propagation edge is opposed to the magnetic pole.

10. The thermally-assisted magnetic recording head as claimed in claim 9, wherein the propagation edge is rounded with a predetermined vertex radius, and a distance between a vertex corresponding to the propagation edge in the near-field-light-generating end surface and an end surface of the magnetic pole on the opposed-to-medium surface side is equal to or more than the vertex radius, and is 100 nanometers or less.

11. The thermally-assisted magnetic recording head as claimed in claim 9, wherein the near-field optical device is covered with a material that has a refractive index lower than a refractive index of a constituent material of the waveguide, a portion of the material that covers the near-field optical device lying between the magnetic pole and the propagation edge.

12. The thermally-assisted magnetic recording head as claimed in claim 11, wherein the waveguide, the portion of the material that covers the near-field optical device, and the near-field optical device are arranged in an Otto configuration.

13. The thermally-assisted magnetic recording head as claimed in claim 11, wherein the material is a constituent material of an overcoat layer formed so as to cover the waveguide, the near-field optical device, and the magnetic pole.

14. The thermally-assisted magnetic recording head as claimed in claim 1, wherein a magnetic shield is provided on a side opposite to the magnetic pole when viewed from the near-field optical device.

15. A head gimbal assembly comprising: a thermally-assisted magnetic recording head as claimed in claim 1; and a suspension supporting the thermally-assisted magnetic recording head.

16. A magnetic recording apparatus comprising:
- at least one head gimbal assembly comprising a thermally-assisted magnetic recording head and a suspension supporting the thermally-assisted magnetic recording head;
- at least one magnetic recording medium; and
- a recording circuit configured to control write operations that the thermally-assisted magnetic recording head performs to the at least one magnetic recording medium, the thermally-assisted magnetic recording head comprising:
- a waveguide through which a light for exciting surface plasmon propagates;
- a near-field optical device configured to be coupled with the light in a surface plasmon mode and to emit near-field light from a near-field-light-generating end surface that forms a portion of an opposed-to-medium surface; and
- a magnetic pole for generating write field from its end on the opposed-to-medium surface side, the near-field optical device comprising: an opposed-to-waveguide surface opposed to the waveguide with a predetermined distance; and a propagation edge provided on a side opposite to the opposed-to-waveguide surface, extending to the near-field-light-generating end surface, and configured to propagate thereon the surface plasmon excited by the light, and the recording circuit further comprising a light-emission control circuit configured to control operations of a light source that generates the light for exciting surface plasmon.

* * * * *